US012783658B2

(12) United States Patent
Beek et al.

(10) Patent No.: US 12,783,658 B2
(45) **Date of Patent: *Nov. 3, 2026**

(54) METHODS AND APPARATUS TO IMPLEMENT A DETERMINISTIC INDICATOR AND CONFIDENCE SCORING MODEL

(71) Applicant: Musarubra US LLC, San Jose, CA (US)

(72) Inventors: Christiaan Beek, Schiphol-Rijk (NL); John Fokker, Schiphol-Rijk (NL); Steve Grobman, Plano, TX (US)

(73) Assignee: Musarubra US LLC, San Jose, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 18/799,680

(22) Filed: Aug. 9, 2024

(65) Prior Publication Data

US 2024/0403427 A1 Dec. 5, 2024

Related U.S. Application Data

(63) Continuation of application No. 17/566,758, filed on Dec. 31, 2021, now Pat. No. 12,093,382.

(51) Int. Cl.

*H04L 29/06* (2006.01)
*G06F 21/56* (2013.01)
*G06N 7/01* (2023.01)

(52) U.S. Cl.

CPC ............... *G06F 21/56* (2013.01); *G06N 7/01* (2023.01); *G06F 2221/034* (2013.01)

(58) Field of Classification Search

CPC . G06F 21/56; H04L 63/0263; H04L 63/1458; H04L 63/08; H04L 63/1433; H04L 63/20

See application file for complete search history.

(56) References Cited

U.S. PATENT DOCUMENTS 9,288,220 B2 3/2016 Raugas et al.
11,194,905 B2 * 12/2021 Sanchez ................ G06F 21/554

(Continued)

FOREIGN PATENT DOCUMENTS

JP WO 2021/144954 * 7/2021

OTHER PUBLICATIONS

European Patent Office, "Extended European Search Report," issued in connection with European Patent Application No. 22216891.6-1218, issued on Apr. 26, 2023, 8 pages.

(Continued)

*Primary Examiner* — Longbit Chai

(74) *Attorney, Agent, or Firm* — Hanley, Flight & Zimmerman, LLC

(57) ABSTRACT

Methods, apparatus, systems, and articles of manufacture are disclosed. In one example, an apparatus includes at least one memory, instructions, and processor circuitry. The processor circuitry at least executes or instantiates the instructions to receive a group of indicators from a campaign attack, then query an indicator database with an indicator from the group of indicators, and then predict an identification of the campaign attack in response to the indicator having a current deterministic indicator and confidence scoring (DISC) score in the indicator database, wherein the DISC score represents at least one of a lethality component, a determinism component, or a confidence component of the indicator.

20 Claims, 11 Drawing Sheets

(56) References Cited

U.S. PATENT DOCUMENTS

| | | | |
|---|---|---|---|
| 11,568,416 B2 | 1/2023 | Ludwig et al. | |
| 2017/0068816 A1* | 3/2017 | Cavazos | G06N 3/084 |
| 2020/0327223 A1 | 10/2020 | Sanchez et al. | |
| 2020/0402061 A1 | 12/2020 | Ludwig et al. | |

OTHER PUBLICATIONS

United States Patent and Trademark Office, "Non-Final Office Action," issued in connection with U.S. Appl. No. 17/566,758, dated Jan. 22, 2024, 11 pages.
United States Patent and Trademark Office, "Notice of Allowance and Fee(s) Due," issued in connection with U.S. Appl. No. 17/566,758, dated May 14, 2024, 7 pages.

* cited by examiner

200

202 204 206 208

| NUMERICAL VALUE | LETHALITY | DETERMINISM | CONFIDENCE (SOURCE CREDIBILITY) |
|---|---|---|---|
| 99 | DEFINITELY MALICIOUS AND OR DESTRUCTIVE (RANSOMWARE, CUSTOM APT MALWARE) | INDICATOR IS UNIQUE AND A CORE INDICATION OF THE CAMPAIGN OR THREAT CROUP | VERY CREDIBLE; NO DOUBT OF AUTHENTICITY, TRUSTWORTHINESS, OR COMPETENCY; HAS A HISTORY OF COMPLETE RELIABILITY. |
| 70 | MALICIOUS – LESS DESTRUCTIVE (RAT, STEALERS, TROJAN) | INDICATOR IS USED IN MULTIPLE CAMPAIGNS BUT IS UNIQUE TO THIS THREAT GROUP | CREDIBLE; MINOR DOUBT ABOUT AUTHENTICITY, TRUSTWORTHINESS, OR COMPETENCY; HAS A HISTORY OF VALID INFORMATION MOST OF THE TIME |
| 50 | MALICIOUS ENABLER (DROPPERS) | INDICATOR HAS UNIQUE CODE SEGMENTS OR COULD BE A VULNERABILITY USED, BUT NOT PER SE UNIQUE TO THIS PARTICULAR CAMPAIGN OR THREAT GROUP | SOME-WHAT CREDIBLE:; MORE RIGHT THAN WRONG |
| 30 | NO SAMPLE AVAILABLE BUT DESCRIPTION OF SAMPLE ANALYSIS FROM SOURCE DESCRIBES PROBABLY MALICIOUS ACTIVITY | INIDICATOR THAT IS PART OF THE CAMPAIGN OR MALWARE SAMPLE WITH LOW AMOUNT OF UNIQUE ELEMENTS (MULTIPLE CAMPAIGNS AND MULTIPLE GROUPS) COMMONDITY MALWARE | NOT USUALLY CREDIBLE; MORE WRONG THAN RIGHT |
| 20 | DUAL USE, PSEXEC, PRODCDUMP E | COMMON USED (NON-MALICIOUS) INDICATOR (LIKE TOR EXIT NODE OR TOOLS LIKE PROCDUMP, PSEXEC) | UNDETERMINED CREDIBILITY, FIRST TIME SOURCE, CROSS VERIFICATION IS NEEDED TO INCREASE CREDIBILITY |
| 10 | DOUBTFUL NOT CONFIRMED; POSSIBLE BUT NO SAMPLE AVAILABLE FOR ANALYSIS OR LACK OF DATA-SOURCE TO CONFIRM. | UNKNOWN: NOT ENOUGH DATA TO CLASSIFY THE DETERMINISM OF THIS INDICATOR | NOT-CREDIBLE; DOUBT OF AUTHENTICITY, TRUSTWORTHINESS, OR COMPETENCY |

FIG. 2A

210

212 214 216 218

| | ------------- DISC SCORE ------------ | | | | |
|---|---|---|---|---|---|
| IOC ID | LETHALITY | DETMINISM | CONFIDENCE | DESCRIPTION | CAMPAIGN TAG ID |
| IOC-000000 | 99 | 50 | 70 | RAT TOOL X | C-00145 |
| IOC-000001 | 70 | 99 | 30 | IP ADDRESS Y | C-04872 |
| IOC-000002 | 20 | 70 | 99 | TEAM COLLABORATION APP Z | C-00145 |

FIG. 2B

METHODS AND APPARATUS TO IMPLEMENT A DETERMINISTIC INDICATOR AND CONFIDENCE SCORING MODEL

RELATED APPLICATION

This patent arises from a continuation of U.S. patent application Ser. No. 17/566,758, filed on Dec. 31, 2021. U.S. patent application Ser. No. 17/566,758 is hereby incorporated herein by reference in its entirety. Priority to U.S. patent application Ser. No. 17/566,758 is hereby claimed.

FIELD OF THE DISCLOSURE

This disclosure relates generally to virus campaign attacks and, more particularly, to implementing a deterministic indicator and confidence scoring model.

BACKGROUND

In recent years, computer virus campaigns have proliferated. When reviewing information that provides an indication of an attack, many indicators are too general to be classified as 'unique' towards a virus campaign. A tool can be utilized for a campaign, yet any use of that tool is not dispositive of the attack (e.g., an application/tool may have been implemented in an attack, yet that application/tool may be utilized in a benign manner elsewhere. Threat-indicators are volatile and can in some cases be manipulated for deceptive purposes.

Sharing virus campaign threat intelligence in the cyber-security industry mostly relies on IOCs (Indicators of Compromise). Vendors and researchers release reports and the community is simply required to 'trust' that verification of each indicator was comprehensive and foolproof (e.g., assumption that indicators are false positives). Per IOC, it remains complicated to tell which are characteristic for a campaign and which are less characteristic (e.g., have a dual use or can change from malicious to non-malicious).

BRIEF DESCRIPTION OF THE DRAWINGS

FIG. 2A is an illustration of an example DISC scoring structure.

FIG. 2B is an illustration of example indicator database entries.

Figure 1:
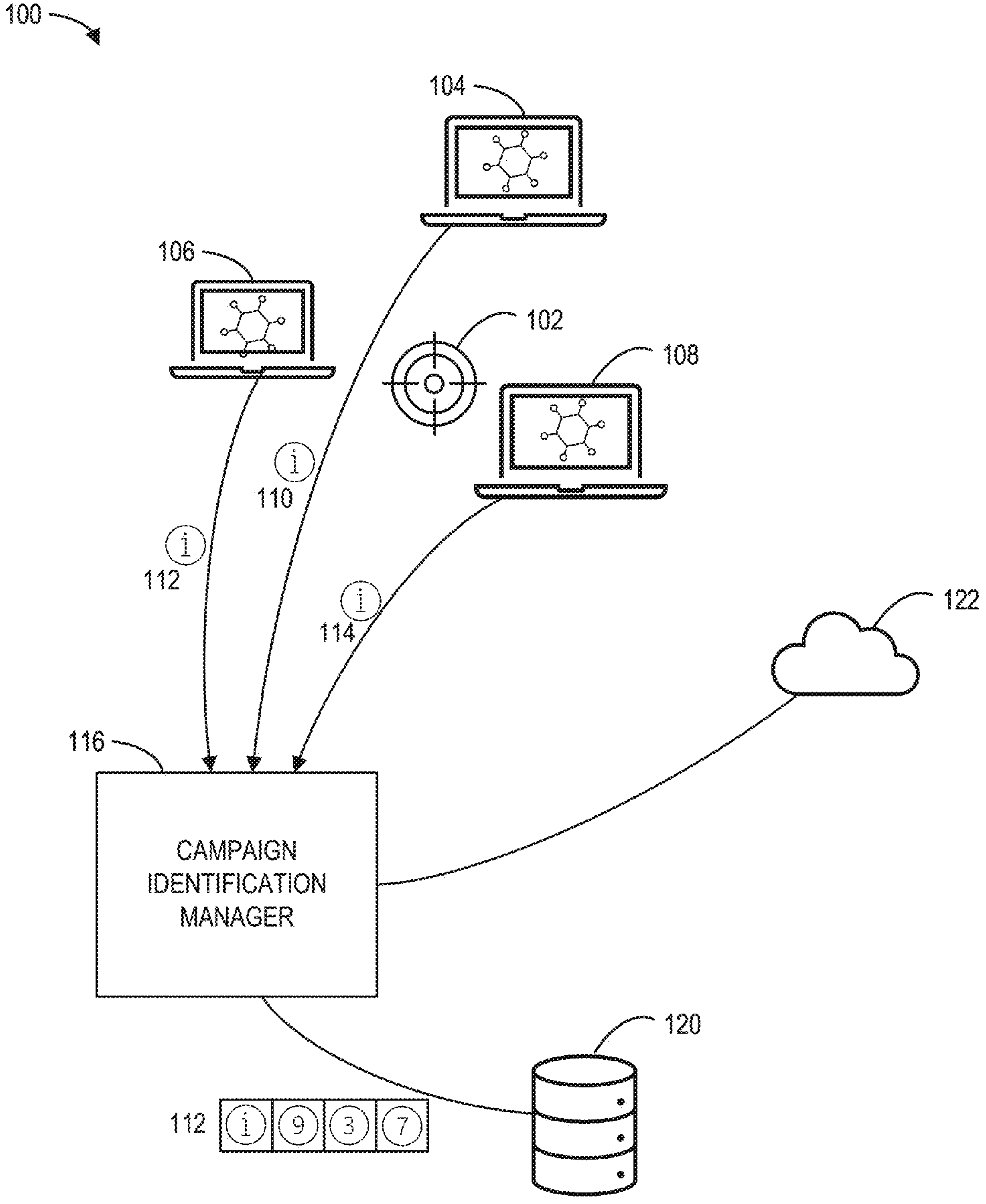
FIG. 1 is an illustration of an example campaign attack identification manager utilizing a DISC scoring model to assess whether observed indicators are deterministic of a virus campaign.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

A virus attack may take place among a group of computing platforms and one or more indicators (e.g., indicators of compromise (IOCs)) are present and may have the capability of providing insight into the identification of the campaign that launched the virus attack. The example IOCs may include information such as internet protocol (IP) addresses (e.g., the IP address origin of the launched virus attack), one or more applications and/or tools associated with the virus campaign attack, and other IOCs. Unfortunately, current threat reports of virus attacks that contain IOCs are drafted with no scoring or guidance as to what measures to take. The threat report becomes very binary and has little use. This tends to cause users to either block or ignore certain IOCs without context. Random blocking and ignoring of IOCs regularly lead to significant problems because indicators of an imminent attack are not acted upon.

Examples disclosed herein can provide an infrastructure to identify a campaign associated with a virus attack by implementing a campaign deterministic indicator and confidence score (DISC) model (e.g., a DISC scoring model). In some examples, a campaign attack identification manager may be present to assist in the identification of the campaign. In some examples, the campaign attack identification manager obtains IOCs and processes them using the DISC scoring model. Then, the example campaign attack identification manager queries an indicator database with the processed DISC scores to determine the identification of the campaign.

FIG. 1 is an illustration of an example campaign attack identification manager utilizing a DISC scoring model to assess whether observed indicators are deterministic of a virus campaign.

In the illustrated example in FIG. 1, a system 100 is present that may be the target of a potential virus attack 102. As used herein, a "campaign" or "virus campaign" generally indicates an organized course of action by a malicious entity utilizing a virus. As used herein, an "attack" or "virus attack" generally indicates an individual event involving a virus, where numerous virus attacks can be involved in a single campaign associated with a specific virus. In some examples, the potential virus attack 102 may infect a series of computing platforms (e.g., computing platforms 104, 106, and 108). In some examples, additional and/or alternative computing platforms that have vulnerabilities to the potential virus campaign attack 102 are affected. Some examples of other computing platforms that may be infected are servers, workstations, desktop computers, laptop computers, routers, switches, mobile devices such as cellular phones and smart watches, industrial computing devices such as robotics systems, smart sensors and other edge devices, computing platforms in vehicles (e.g., automobiles, trucks, planes, trains, etc.), among other possible computing platforms that may be vulnerable to infection. In some examples, the computing platforms 104, 106, and 108 may unknowingly be infected by a virus. In some examples, computing platforms 104, 106, and 108 may send IOCs (e.g., IOCs 110, 112, and 114) to a campaign identification manager 116. For example, anti-virus software installed on one or more of the computing platforms 104, 106, and 108 may observe IOCs on a local network, on other local computing platforms in a local network, and/or on the same computing platform as the anti-virus software. In some examples, other monitoring devices/platforms that have visibility the computing platforms 104, 106, and 108 operating environment and/or local network may also send IOCs to the campaign identification manager 116.

For example, a threat report from the US government describes a campaign X, which is a ransomware attack against target Y. During the campaign the attackers used a collection of tools and infrastructure to achieve their goal (e.g., the IOCs). There were 5 IOCs that were part of the campaign: 3 tools and 2 IP-addresses. The example tools are 1) the actual ransomware unique to this group, but used in other campaigns, 2) the remote administration tool to gain entry on the network, and 3) a team collaboration tool, version 1.0. The IP addresses related to the ransomware attack are 1) an IP address used by remote administration tool and by the team collaboration tool to connect, and 2) a Tor exit node used in malware staging.

In some examples, the campaign identification manager 116 may have access to an indicator database 120 and use the database to look up the example indicators (e.g., IOCs), as described above, that were received to determine if they are already known. In some examples, the database lookup utilizes a DISC score query system.

FIG. 2A is an illustration of an example deterministic indicator and confidence score (DISC) scoring structure. The example DISC scoring structure 200 includes a series of DISC numerical values 202 and at least three major components (e.g., factors) (lethality 204, determinism 206, and confidence 208). Each component is applied to a given IOC to create a DISC score for the IOC. In some examples, additional and/or alternative components may be utilized in an example DISC scoring structure 200. The "lethality" component is defined as a measure of the maliciousness and/or destructiveness of an IOC. In some examples, the determinism 206 component is associated with a likelihood that the use of a given IOC is meant for an attack. In some examples, the confidence 208 component is associated with the credibility of the source of the indicator.

Each component in the example DISC scoring structure 200 has level classifications that correspond to an associated DISC numerical value 202. For example, a ransomware program is highly malicious on its face and destructive, thus will receive a high lethality 204 level (e.g., 99 on a scale of 0-99 levels). For example, a virus monitoring service that reports indicators has a strong history of accuracy and has reliable information most of the time, and thus renders a relatively high confidence 208 level (e.g., 70 on a scale of 0-99 levels). For example, a common IP address (e.g., a Tor exit node) is utilized many times for benign/legitimate purposes, and thus renders a relatively low determinism 206 level (e.g., 20 on a scale of 0-99 levels).

In some examples, the DISC scoring structure 200 has any number of numerical value levels that are implemented to distinguish between. For example, a simple DISC scoring structure 200 may have 2-3 numerical value levels and a complex DISC scoring structure 200 may have 100+ numerical value levels.

Returning to the illustrated example in FIG. 1, the campaign identification manager 116 receives the IOCs 110, 112, and 114 and determines if each IOC is DISC scored (e.g., the DISC score for each IOC component may have been previously determined). In different examples, none of the IOCs are DISC scored, some of the IOCs are DISC scored, or all of the IOCs are DISC scored. In some examples, the campaign identification manager 116 separates the received (e.g., obtained) IOCs into a group of IOCs that have DISC scores and a group of IOCs that do not have DISC scores. In some examples, one or more components of a DISC score may have been previously determined without a determination made of one or more other components (e.g., the confidence component of a specific source may be known generally across all IOCs as completely reliable regardless of the information the source provides).

In some examples, the campaign identification manager 116 determines new DISC scores for the IOCs that do not yet have DISC scores. In some examples, the campaign identification manager 116 causes the newly determined DISC scores (e.g., DISC score 118) to be stored in an indicator database 120, the DISC scores being stored with the associated IOC information.

FIG. 2B is an illustration of example entries in the indicator database 120. The example entries 210 includes a series of rows in the indicator database 120. In some examples, each entry includes an IOC ID 212 (e.g., an ID to use for look up purposes in the indicator database 120). Associated with each IOC ID 212 is the DISC score 214, which includes separate information for each of the component DISC scores (e.g., the lethality, determinism, and/or confidence components, and/or any other components that may provide further information related to an IOC). In some examples, each entry also includes a description 216 which may include the standard name of the IOC that is associated with the IOC ID 212 among other information that could be entered into the description. Additionally or alternatively, one or more other columns per entry row are may also be stored for the purposes of providing further information about the IOC. For example, campaign tag IDs associated with each IOC ID 212 may be stored in entries within the indicator database 120. In some examples, if an IOC is not associated with a campaign, the campaign tag ID element may be blank.

Returning to the illustrated example in FIG. 1, the campaign identification manager 116 queries the database when an IOC (e.g., IOC 110, IOC 112, IOC 114, etc.) that includes a DISC score is received/obtained. In some examples, the campaign identification manager 116 queries the indicator database 120 with a complete DISC score associated with an IOC (e.g., a DISC score including all three primary components-lethality, determinism, and confidence). In some examples, the campaign identification manager 116 calculates a combined DISC score using multiple DISC scores components per IOC (e.g., lethality, determinism, confidence, and/or one or more other DISC scores). In some examples, the campaign identification manager 116 calculates a combined DISC score using multiple DISC scores associated with multiple IOCs. In some examples, a combined DISC score across certain groups of computing platforms (e.g., computing platforms 104, 106, and 108) may provide an average DISC score. For example, computing platforms may be logically grouped due to a common network, a common geography, a common active window of time that the computing platforms are operational to potentially be victim to an attack, etc. In some examples, the campaign identification manager 116 queries the indicator database 120 with a partial DISC score (e.g., a subset of DISC component scores such as a confidence component only).

In some examples, the campaign identification manager 116 queries the database with the received DISC score(s). For example, the query can use an individual DISC score or an average DISC score, as discussed above. In some examples, the campaign identification manager 116 determines an identification of a campaign behind the potential virus attack 102 by comparing the DISC score used in the query to entries in the indicator database 120. In some examples, the campaign identification manager 116 checks for an IOC in the indicator database 120 that has a closest DISC score to the DISC score used in the query to complete the identification of the campaign.

In the illustrated example in FIG. 1, the campaign identification manager 116 is communicatively coupled to a network and/or cloud 122. In some examples, the campaign identification manager 116 sends the identification of the campaign virus attack 102 to one or more additional computing platforms across the network/cloud 122. In some examples, the campaign identification manager 116 obtains additional information about the campaign and or additional virus attacks associated with the campaign from one or more remote computing platforms across the network/cloud 122. In some examples, the campaign identification manager 116 obtains entries to be stored in the indicator database 120 from one or more remote computing platforms across the network/cloud 122 (e.g., database entries that have DISC scores to bolster the knowledge base stored in the indicator database 120).

Figure 3:
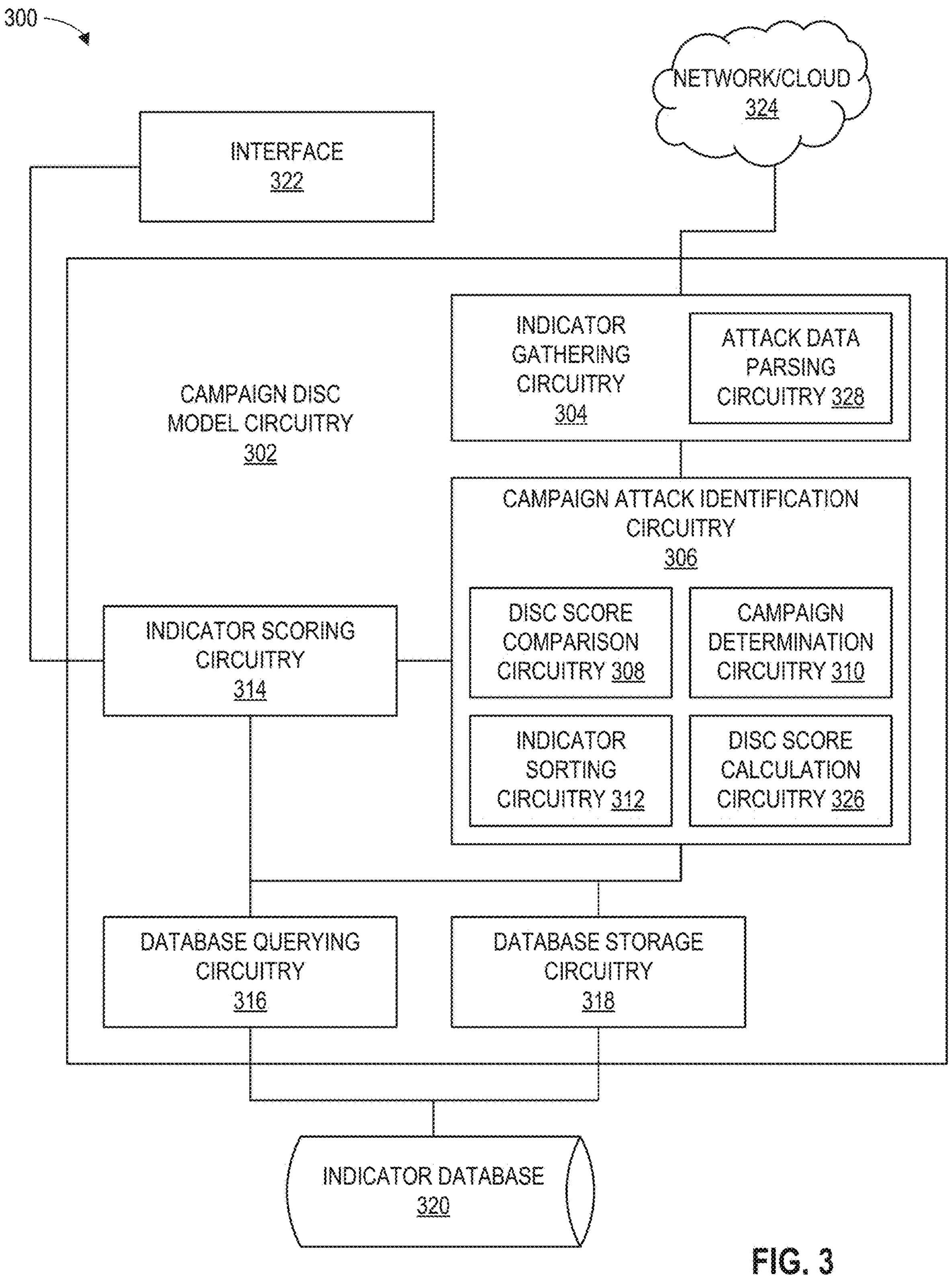
FIG. 3 is a block diagram of an example schematic implementation of the campaign attack identification manager of FIG. 1.

FIG. 3 is a block diagram of a system that includes the example schematic implementation of the campaign identification manager 116 of FIG. 1. In some examples, the campaign DISC model circuitry 302 of FIG. 3 can implement the campaign identification manager 116 of FIG. 1.

The campaign identification manager 116 of FIG. 1 may be instantiated (e.g., creating an instance of, bring into being for any length of time, materialize, implement, etc.) by processor circuitry such as a central processing unit executing instructions. Additionally or alternatively, the campaign identification manager 116 of FIG. 1 may be instantiated (e.g., creating an instance of, bring into being for any length of time, materialize, implement, etc.) by an ASIC or an FPGA structured to perform operations corresponding to the instructions. It should be understood that some or all of the campaign identification manager 116 of FIG. 1 may, thus, be instantiated at the same or different times. Some or all of the campaign identification manager 116 may be instantiated, for example, in one or more threads executing concurrently on hardware and/or in series on hardware. Moreover, in some examples, some or all of the campaign identification manager 116 of FIG. 1 may be implemented by one or more virtual machines and/or containers executing on processor circuitry.

The campaign DISC model circuitry 302 of the illustrated example in FIG. 3 includes example indicator gathering circuitry 304, example campaign attack identification circuitry 306, example DISC score comparison circuitry 308, example campaign determination circuitry 310, example indicator sorting circuitry 312, example indicator scoring circuitry 314, example database querying circuitry 316, and example database storage circuitry 318. In some examples, a circuitry block shown in FIG. 3 can transmit data to from another circuitry block in FIG. 3 using communication via a bus. In some examples, a bus can be implemented using at least one of an Inter-Integrated Circuit (I2C) bus, a Serial Peripheral Interface (SPI) bus, a Peripheral Component Interconnect (PCI) bus, or a Peripheral Component Interconnect Express (PCIe or PCIE) bus. Additionally or alternatively, the bus can be implemented by any other type of computing or electrical bus.

The indicator gathering circuitry 304 receives (e.g., obtains) a group of indicators (e.g., IOCs) from a potential virus attack. In some examples, the indicator gathering circuitry 304 receives one or more of the IOCs from computer platforms that may be infected with a virus. In some examples, the indicator gathering circuitry 304 receives one or more of the IOCs from one or more monitoring computing platforms that had knowledge of the potential virus attack. In some examples, the indicator gathering circuitry 304 receives one or more of the IOCs from another indicator database in the virus protection community. In some examples, all of the IOCs in the group of indicators arrive at a single point of time. In some examples, the IOCs in the group of indicators arrive at different points of time. In some examples, the indicator gathering circuitry 304 processes the IOCs as they arrive. In some examples, the indicator gathering circuitry 304 includes a buffer that stores IOCs until a number have been received and then the indicator gathering circuitry 304 processes in parallel all IOCs received in a window of time. In some examples, the buffer is an amount of memory and/or storage space capable of storing IOC information received. In some examples, the buffer is a first-in-first-out (FIFO) buffer. In some examples, the buffer tracks a frequency of IOCs received and queues groups of IOCs received within a threshold delay between consecutive received IOCs, where the indicator gathering circuitry 304 flushes the buffer by sending the data in the buffer to a campaign attack identification circuitry 306 once the frequency of IOCs received is reduced where the delay between any two consecutive received IOCs exceeds the threshold delay. In some examples, the IOC arrives at the indicator gathering circuitry 304 with a DISC score attached. In some examples, the IOC arrives at the indicator gathering circuitry 304 without a DISC score attached, but the IOC was previously saved in the indicator database 320 with a DISC score.

The attack data parsing circuitry 328 parses attack data into a group of indicators. In some examples, raw attack data from an attack is received (e.g., obtained) from one or more sources. For example, a report of an attack on a business may be obtained. The report may be in English and contain several elements related to the attack. For example, a log file from a computer subjected to an attack may be obtained. The log file may store information related to IP addresses, executed applications, etc. The attack data parsing circuitry 328 receives the attack data and parses specific IOCs to be utilized by the campaign DISC model circuitry 302. Thus, in some examples, the indicator gathering circuitry 304 receives a group of one or more indicators (e.g., IOCs). And, in some examples, the indicator gathering circuitry 304 receives attack data and the attack data parsing circuitry 328 parses the group of one or more indicators out of the attack data.

In some examples, the indicator gathering circuitry 304 includes means for receiving (e.g., obtains) a group of indicators (e.g., IOCs). For example, the means for receiving may be implemented by indicator gathering circuitry 304. In some examples, the indicator gathering circuitry 304 may be implemented by machine executable instructions such as that implemented by at least block 402 of FIG. 4 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the indicator gathering circuitry 304 is implemented by other hardware logic circuitry, hardware implemented state machines, and/or any other combination of hardware, software, and/or firmware. For example, the indicator gathering circuitry 304 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The campaign attack identification circuitry 306 predicts an identification of the campaign attack in response to the indicator having a current DISC score in the indicator database. In the illustrated example in FIG. 3, the campaign attack identification circuitry 306 includes internal circuitry sub-blocks that perform specific functions to help identify a campaign virus attack. In some examples, the DISC score comparison circuitry 308, the campaign determination circuitry 310, the indicator sorting circuitry 312, and the DISC score calculation circuitry 326 are integrated into the campaign attack identification circuitry 306.

In some examples, the campaign attack identification circuitry 306 includes means for predicting an identification of the campaign attack in response to an indicator having a current deterministic indicator and confidence scoring (DISC) model score in the indicator database. For example, the means for predicting may be implemented by campaign attack identification circuitry 306. In some examples, the campaign attack identification circuitry 306 may be implemented by machine executable instructions such as that implemented by at least block 408 of FIG. 4 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the campaign attack identification circuitry 306 is implemented by other hardware logic circuitry, hardware implemented state machines, and/or any other combination of hardware, software, and/or firmware. For example, the campaign attack identification circuitry 306 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The DISC score comparison circuitry 308 compares the DISC score of the first indicator (e.g., IOC) with one or more indicators stored in the indicator database. In some examples, the DISC score comparison circuitry 308 compares the DISC score of a single IOC received to a single DISC score associated with an IOC stored in the indicator database 320. In some examples, the DISC score comparison circuitry 308 compares the combined DISC score of multiple IOCs to a single DISC score associated with an IOC stored in the indicator database 320. In some examples, the DISC score comparison circuitry 308 repeats a comparison between the received IOC DISC score to each of many DISC scores associated with an IOC stored in the indicator database 320 as the database is traversed to find the closest match.

In some examples, the DISC score comparison circuitry 308 includes means for comparing the DISC score of the first indicator with one or more DISC scores associated with indicators stored in the indicator database. For example, the means for comparing may be implemented by DISC score comparison circuitry 308. In some examples, the DISC score comparison circuitry 308 may be implemented by machine executable instructions such as that implemented by at least block 502 of FIG. 5 and 606 of FIG. 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the DISC score comparison circuitry 308 is implemented by other hardware logic circuitry, hardware implemented state machines, and/or any other combination of hardware, software, and/or firmware. For example, the DISC score comparison circuitry 308 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the indicator database 320 utilizes a vector distance comparison scheme that attributes the amount of difference between any two DISC scores to be represented by the length of a vector between the two DISC scores, thus, the shorter the vector distance, the closer the match of DISC scores. In some examples, the individual component parts of a DISC score (e.g., the lethality component, the determinism component, and the confidence component) are compared separately to DISC component scores associated with IOCs stored in the indicator database 320.

In some examples, the individual component parts of a DISC score (e.g., the lethality component, the determinism component, and the confidence component) are each weighted uniquely (e.g., with added weight factors multiplied to each component) to emphasize one component over another based on any number of circumstances. In some examples, the DISC score comparison circuitry 308 utilizes a Bayesian statistical probability model that computes the likelihood of the identity of the campaign based on one or more known IOCs with specific DISC scores. In some examples, as additional IOCs with specific DISC scores become known, the statistical probability of a given identification of a campaign may increase. For example, the identification of a campaign being the XYZ virus is computed to be a 60% probability if IP address ABC is present in a local network/system. Whereas, the identification of the campaign being the XYZ virus is computed to be an 80% probability if both the IP address ABC is present in a network/system and the application DEF is simultaneously used in concert with the IP address ABC. In some examples, the value of a DISC score (singular or combined) in a Bayesian probability equation will indicate a higher probability of the presence of the campaign associated with the first stored indicator than a presence of one or more other campaigns.

The DISC score calculation circuitry 326 calculates a combined DISC score from a set of DISC scores associated with the first subgroup of indicators. In some examples, the DISC score calculation circuitry 326 calculates the component scores (e.g., the lethality component, the determinism component, and the confidence component) across each of the separate DISC scores being combined and provides a combined component score that takes a mean (e.g., average) of each set of component scores and inserts that as the combined component score, which is a portion of the combined DISC score. In some examples, the component scores in each separate DISC score have weight factors added, which may modify the weight factors as they are combined. In some examples, the component scores are combined together into a single score to aid in identification determination. In some examples, the DISC score calculation circuitry 326 provides the calculated combined DISC score to the DISC score comparison circuitry 308.

In some examples, the DISC score calculation circuitry 326 includes means for calculating a combined DISC score from a set of DISC scores associated with the first subgroup of indicators. For example, the means for calculating may be implemented by DISC score calculation circuitry 326. In some examples, the DISC score calculation circuitry 326 may be implemented by machine executable instructions such as that implemented by at least block 604 of FIG. 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the DISC score calculation circuitry 326 is implemented by other hardware logic circuitry, hardware implemented state machines, and/or any other combination of hardware, software, and/or firmware. For example, the DISC score calculation circuitry 326 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The campaign determination circuitry 310 determines the identification of the campaign attack at least partially in response to the DISC score of the first indicator being a closer score to a DISC score of a first stored indicator in the indicator database that to one or more other stored indicators in the indicator database, the stored indicator associated with the campaign attack. In some examples, the campaign determination circuitry 310 receives the results of the comparison from the DISC score comparison circuitry 308 and makes a final determination as to the identity of a campaign.

In some examples, the campaign determination circuitry 310 utilizes a threshold comparison value to determine whether or not to positively identify a campaign (e.g., report the identification of a campaign to an entity such as the user of a computer, the administrator of a network, and/or the virus protection community, among other entities). For example, if the DISC score comparison circuitry 308 traverses the indicator database 320 and does not find a stored DISC score associated with a campaign that is close enough (e.g., within a maximum threshold value distance/discrepancy), then no campaign is identified. In some examples, the DISC score comparison circuitry 308 applies a maximum threshold value associated with the difference(s) between the compared DISC scores to minimize false positive results. In some examples, some or all of the stored indicators in the indicator database have associated campaign tag IDs if a given indicator is associated with a campaign, such as a campaign tag ID 218 in FIG. 2 (e.g., linked through evidence or otherwise).

In some examples, the campaign determination circuitry 310 includes means for determining the identification of the campaign attack at least partially in response to the DISC score of the first indicator (or a combined DISC score indicator) being a closer score to a DISC score of a first stored indicator in the indicator database that to one or more other stored indicators in the indicator database, the first stored indicator associated with the campaign attack. The campaign determination circuitry additionally includes means for reporting the identification of the campaign in response to a difference between the DISC score and a DISC score associated with at least one of the indicators stored in the indicator database not exceeding a maximum threshold value. For example, the means for determining may be implemented by campaign determination circuitry 310. In some examples, the campaign determination circuitry 310 may be implemented by machine executable instructions such as that implemented by at least block 504 of FIG. 5 and 608 of FIG. 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In some examples, the campaign determination circuitry 310 includes means for reporting the identification of the campaign in response to a difference between the DISC score and a DISC score associated with at least one of the indicators stored in the indicator database not exceeding a maximum threshold value. For example, the means for reporting may be implemented by campaign determination circuitry 310. In some examples, the campaign determination circuitry 310 may be implemented by machine executable instructions such as that implemented by at least block 506 and 508 of FIG. 5 and 608 of FIG. 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the campaign determination circuitry 310 is implemented by other hardware logic circuitry, hardware implemented state machines, and/or any other combination of hardware, software, and/or firmware. For example, the campaign determination circuitry 310 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The indicator sorting circuitry 312 sorts the group of indicators into a first subgroup of indicators with DISC scores and a second subgroup of indicators without DISC scores. In some examples, the indicator sorting circuitry 312 distinguishes indicators (IOCs) within the group of indicators as those that have DISC scores and those that do not have DISC scores to separate IOCs that require scoring vs. IOCs that can be utilized with current DISC scores. In some examples, the DISC score comparison circuitry 308 and the DISC score calculation circuitry 326 may utilize IOCs in the subgroup that has DISC scores. In some examples, within each subgroup, the DISC score comparison circuitry 308 may sort the IOCs based by any number of factors, including overall DISC score, or a specific DISC component score, or by any other factor or no additional factor.

In some examples, the indicator sorting circuitry 312 includes means for sorting the group of indicators into a first subgroup of indicators with DISC scores and a second subgroup of indicators without DISC scores. For example, the means for sorting may be implemented by indicator sorting circuitry 312. In some examples, the indicator sorting circuitry 312 may be implemented by machine executable instructions such as that implemented by at least block 602 of FIG. 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the indicator sorting circuitry 312 is implemented by other hardware logic circuitry, hardware implemented state machines, and/or any other combination of hardware, software, and/or firmware. For example, the indicator sorting circuitry 312 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The indicator scoring circuitry 314 scores the indicator with a new DISC score in response to the indicator not having a current DISC score. In some examples, the indicator scoring circuitry 314 scores an IOC based on evaluating the similarity of code or other information in an IOC. For example, the attack data parsing circuitry 328 may parse attack information received and pull an IP address out of the attack information. The indicator scoring circuitry 314 may send a request to the database querying circuitry 316 to query the indicator database 320 for the IP address content. If the search comes back with a match or a close similarity, the IOC can be scored appropriately with a similar or same DISC score to the previous indicator database 320 entry with the parsed IP address. For example, the attack data parsing circuitry 328 may parse attack information received and pull a malicious code snippet integrated into a tool out of the attack information. The indicator scoring circuitry 314 may send a request to the database querying circuitry 316 to query the indicator database 320 for a reference to the tool or a reference to the malicious code snippet in the tool. If the search comes back with a match or a close similarity, the indicator can be scored appropriately. In some examples, the indicator scoring circuitry can update a DISC score in the indicator database 320 if new information is received that lessens the accuracy of one or more indicators and the information associated with the indicators (e.g., a DISC score and/or a descriptive term or other data associated with a stored IOC). In some examples, the indicator scoring circuitry 314 sends and receives information with either or both of the database querying circuitry 316 to retrieve information from the indicator database 320 or the database storage circuitry 318 to cause information to be stored in the indicator database 320.

In some examples, the indicator scoring circuitry 314 includes means for scoring an indicator with a new DISC score in response to the indicator not having a current DISC score. For example, the means for scoring may be implemented by indicator scoring circuitry 314. In some examples, the indicator scoring circuitry 314 may be implemented by machine executable instructions such as that implemented by at least block 410 of FIG. 4 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the indicator scoring circuitry 314 is implemented by other hardware logic circuitry, hardware implemented state machines, and/or any other combination of hardware, software, and/or firmware. For example, the indicator scoring circuitry 314 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The database querying circuitry 316 queries an indicator database with an indicator from the group of indicators. In some examples, the database querying circuitry 316 queries the indicator database 320 with a wider variety of requests, such as querying the indicator database 320 for code snippets, IP addresses, tool and application names, environmental conditions, timestamps, and any one or more other types of queries. In some examples, the database querying circuitry 316 utilizes a standard query language (SQL) to query the indicator database 320. In some examples, the database querying circuitry 316 utilizes one or more other methodologies to query the indicator database 320 for information.

In some examples, the database querying circuitry 316 includes means for querying an indicator database with an indicator from the group of indicators. For example, the means for querying may be implemented by database querying circuitry 316. In some examples, the database querying circuitry 316 may be implemented by machine executable instructions such as that implemented by at least block 404 and 406 of FIG. 4 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the database querying circuitry 316 is implemented by other hardware logic circuitry, hardware implemented state machines, and/or any other combination of hardware, software, and/or firmware. For example, the database querying circuitry 316 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The database storage circuitry 318 causes the new DISC score to be stored in the indicator database. In some examples, to "cause" storage of information, the database storage circuitry 318 utilizes a system call to an operating system, to a storage controller, or to another system service capable of storing information in the indicator database. In some examples, the database storage circuitry 318 includes internal logic that functions to store information directly into the indicator database from a memory and/or a storage device.

In some examples, the database storage circuitry 318 includes means for causing the new DISC score to be stored in the indicator database. For example, the means for causing may be implemented by database storage circuitry 318. In some examples, the database storage circuitry 318 may be implemented by machine executable instructions such as that implemented by at least block 412 of FIG. 4 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the database storage circuitry 318 is implemented by other hardware logic circuitry, hardware implemented state machines, and/or any other combination of hardware, software, and/or firmware. For example, the database storage circuitry 318 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The indicator database 320 stores one or more IOCs and associated DISC scores. The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list or in any other form. In some examples, the indicator database 320 is an industry standard database (e.g., SQL database, etc.). In some examples, the indicator database 320 is a data structure stored on a computing platform. In some examples, the indicator database 320 is a relational database.

In certain circumstances, automated indicator DISC scoring (e.g., by the indicator scoring circuitry 314) can be augmented by manual administrator scoring of IOCs. In some examples, the interface 322 receives a manual DISC score for at least one indicator from the group of indicators. In some examples, the interface 322 may include any type of hardware and/or software capable of receiving human input. Elements of the interface 322 may include a keyboard, mouse, display, microphone, camera, user interface application, among other elements that provide a human input/output ability from/to the campaign DISC model circuitry 302.

The network/cloud 324 provides communication links between the Internet, any one or more networks and/or clouds, and any one or more other computing platforms with the campaign DISC model circuitry 302. For example, attack information, groups of indicators, and other information/data can be received/obtained from the network/cloud 324.

While an example manner of implementing the campaign DISC model circuitry 302 is illustrated in FIG. 3, one or more of the elements, processes, and/or devices illustrated in FIG. 3 may be combined, divided, re-arranged, omitted, eliminated, and/or implemented in any other way. Further, the example indicator gathering circuitry 304, the example campaign attack identification circuitry 306, the example DISC score comparison circuitry 308, the example campaign determination circuitry 310, the example indicator sorting circuitry 312, the example indicator scoring circuitry 314, the example database querying circuitry 316, the example database storage circuitry 318, the example DISC score calculation circuitry 326, the example attack data parsing circuitry 328, and/or, more generally, the example campaign DISC model circuitry 302 of FIG. 3, may be implemented by hardware, software, firmware, and/or any combination of hardware, software, and/or firmware. Thus, for example, any of the example indicator gathering circuitry 304, the example campaign attack identification circuitry 306, the example DISC score comparison circuitry 308, the example campaign determination circuitry 310, the example indicator sorting circuitry 312, the example indicator scoring circuitry 314, the example database querying circuitry 316, the example database storage circuitry 318, the example DISC score calculation circuitry 326, the example attack data parsing circuitry 328, and/or, more generally, the example campaign DISC model circuitry 302, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device (s) (FPLD(s)) such as Field Programmable Gate Arrays (FPGAs). When reading any of the apparatus or system claims of this patent to cover a purely software and/or firmware implementation, at least one of the example indicator gathering circuitry 304, the example campaign attack identification circuitry 306, the example DISC score comparison circuitry 308, the example campaign determination circuitry 310, the example indicator sorting circuitry 312, the example indicator scoring circuitry 314, the example database querying circuitry 316, the example database storage circuitry 318, the example DISC score calculation circuitry 326, the example attack data parsing circuitry 328, and/or, more generally, the example campaign DISC model circuitry 302, is/are hereby expressly defined to include a non-transitory computer readable storage device or storage disk such as a memory, a digital versatile disk (DVD), a compact disk (CD), a Blu-ray disk, etc., including the software and/or firmware. Further still, the example campaign DISC model circuitry 302 of FIG. 3 may include one or more elements, processes, and/or devices in addition to, or instead of, those illustrated in FIG. 3, and/or may include more than one of any or all of the illustrated elements, processes and devices.

Figure 4:
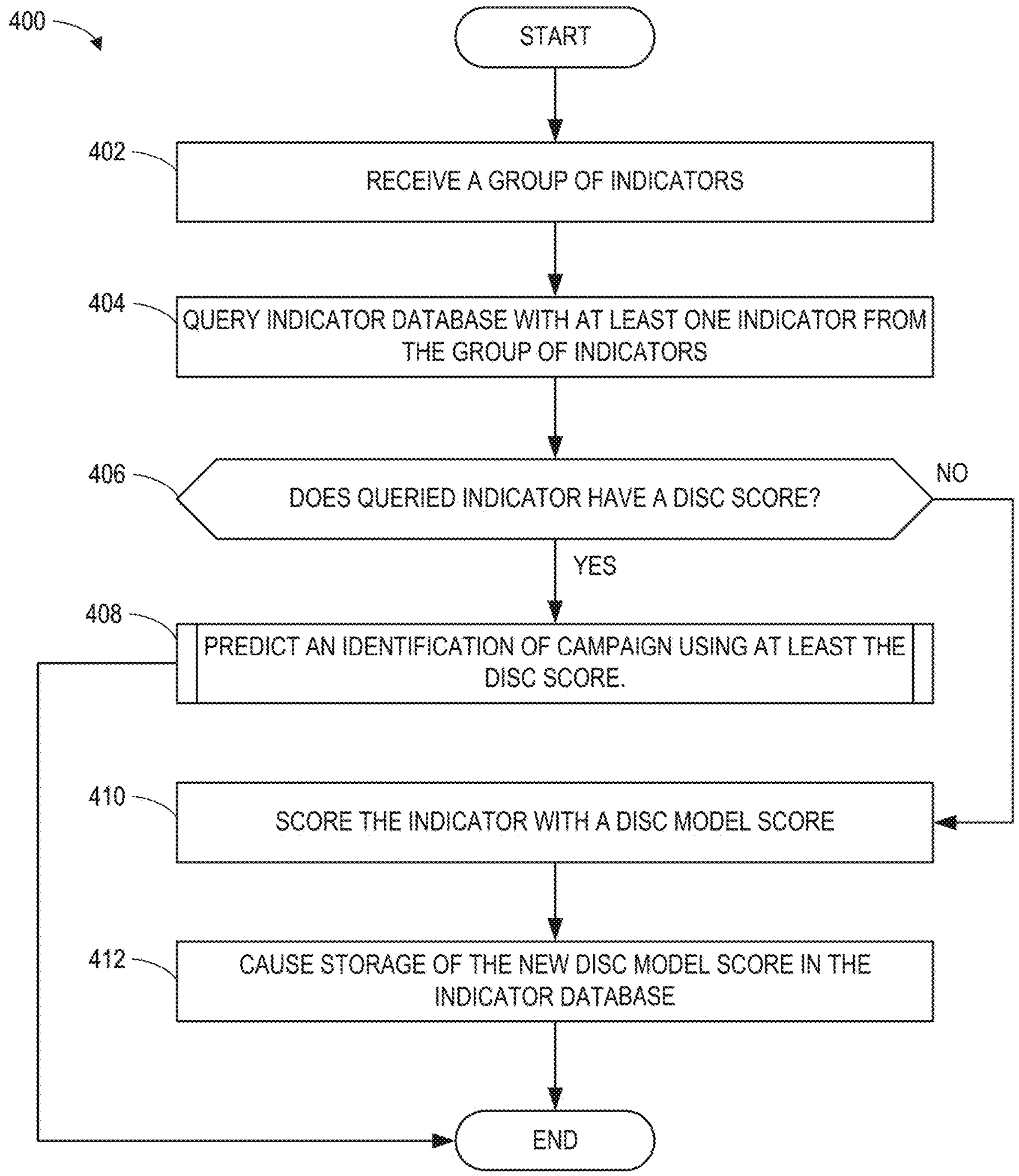
FIG. 4 is a flowchart representative of example machine readable instructions and/or example operations that may be executed and/or instantiated by processor circuitry to implement a deterministic indicator confidence scoring model.
Figure 5:
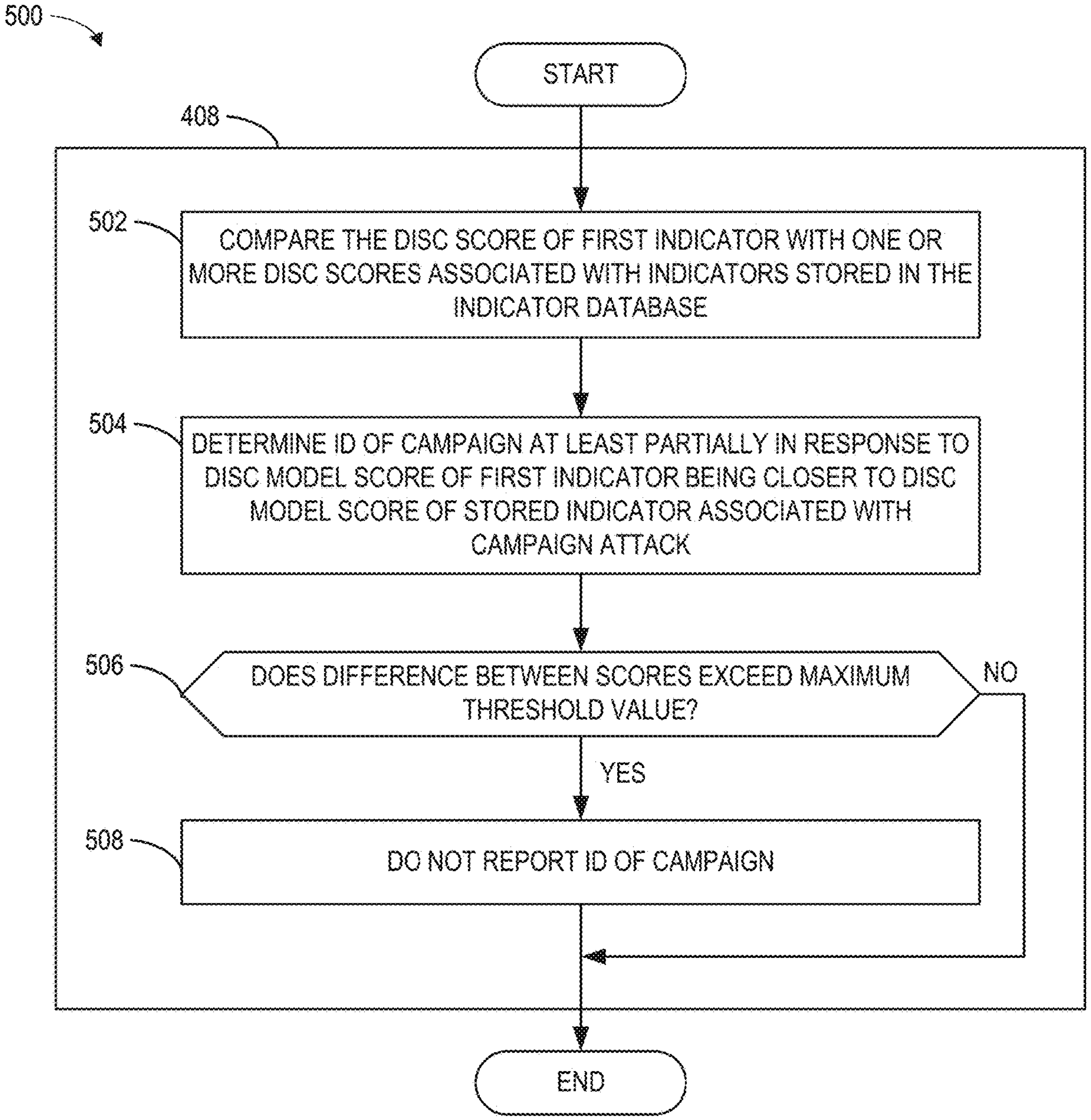
FIG. 5 is a flowchart representative of example machine readable instructions and/or example operations that may be executed and/or instantiated by processor circuitry to implement a process to predict an identification of a campaign attack.
Figure 6:
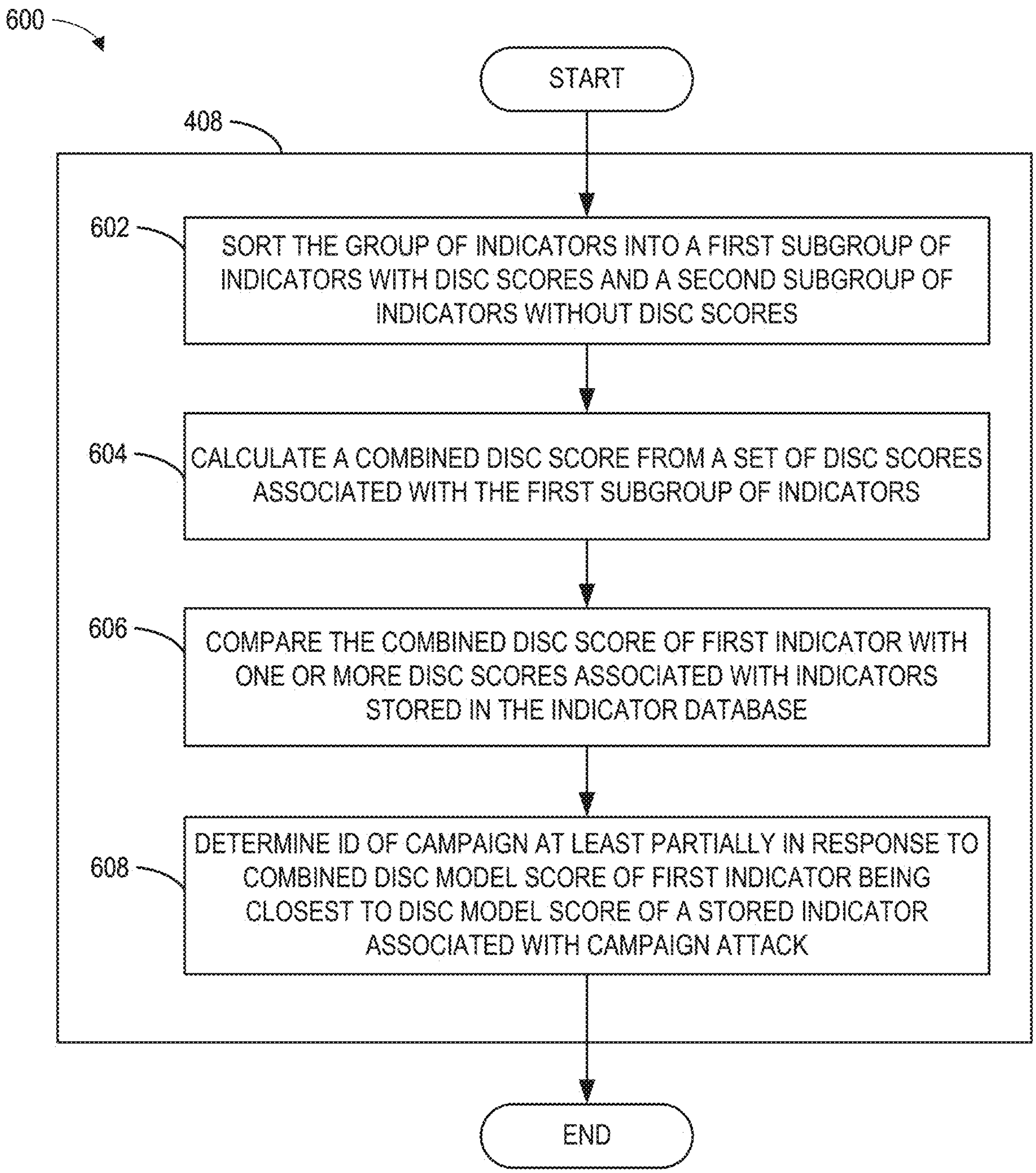
FIG. 6 is a flowchart representative of example machine readable instructions and/or example operations that may be executed and/or instantiated by processor circuitry to implement an alternative process to predict an identification of a campaign attack.

A flowchart representative of example hardware logic circuitry, machine readable instructions, hardware implemented state machines, and/or any combination thereof for implementing the system 300 of FIG. 3 is shown in FIGS. 4-6. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 4-6, many other methods of implementing the example system 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4-6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions and/or example operations that may be executed and/or instantiated by processor circuitry to implement a deterministic indicator confidence scoring model.

The machine readable instructions and/or operations of FIG. 4 are described in connection with the example campaign DISC model circuitry 302, and, more specifically, the example database querying circuitry 316, the example indicator gathering circuitry 304, the example campaign attack identification circuitry 306, the example indicator scoring circuitry 314, and the example database storage circuitry 318.

In the illustrated example of FIG. 4, the example machine readable instructions and/or the example operations 400 of FIG. 4 begin at block 402, at which, the indicator gathering circuitry 304 receives a group of indicators from a campaign attack. In some examples, the received (e.g., obtained) indicators are received over a network/cloud 324. In some examples, the indicators are received over a period of time. In some examples, the indicators are received in a specific data format, such as a data format similar to a row of the indicator database (as seen in FIG. 2B). In some examples, a given indicator has already been parsed from attack data and includes at least an IOC ID 212 and a description 216. In some examples, the received indicator may also include a DISC score 214 and/or a campaign tag ID 218, among other additional information. In some examples, the indicator gathering circuitry 304 receives raw attack data in lieu of, or in addition to, a group of one or more indicators, and attack data parsing circuitry 328 parses the attack data to retrieve one or more indicators.

At block 404, the database querying circuitry 316 queries the indicator database 320 with at least one indicator from the group of indicators. In some examples, the database querying circuitry 316 queries the indicator database 320 with a DISC score to search for similar DISC scores. In some examples, the database querying circuitry 316 queries the indicator database 320 with other indicator information to search for similar information. For example, the database querying circuitry 316 may use a campaign tag ID (218 in FIG. 2) or at least portions of the description of an indicator (216 in FIG. 2) to query the indicator database 320.

At block 406, the database querying circuitry 316 determines if the queried indicator has a DISC score. In some examples, the query returns a resulting value and if the value is non-zero, the indicator database 320 has a DISC score entry for the indicator and the database querying circuitry 316 determines that there is a DISC score stored in the database for the particular indicator in question ("YES"). Otherwise, the database querying circuitry 316 determines that there is not a DISC score stored in the database for the particular indicator in question ("NO").

If the queried indicator has a DISC score, then, at block 408, the example campaign attack identification circuitry 306 predicts an identification of the campaign attack using at least the DISC score. A more detailed description as to the identification prediction is discussed below in reference to FIGS. 5 and 6.

If the queried indicator does not have a DISC score, then, at block 410, the example indicator scoring circuitry 314 scores the indicator with a DISC score. As discussed above, the scoring process can take one or more of several forms. In some examples, the example indicator scoring circuitry 314 manages an automated scoring process and may utilize one or more of several methodologies to determine the DISC score. These processes can include comparing information regarding the indicator to information stored in the indicator database to find similarities, and, if similar enough, score one or more of the components that make up the DISC score similar to the score of one or more similar stored indicators. In some examples, one or more neural networks may be employed to assist with code/data/language comparison determinations to find similarities. In some examples, an administrator may manually enter in a DISC score and override the automated process.

At block 412, the example database storage circuitry 318 causes storage of the new DISC score in the indicator database and the example machine readable instructions and/or the example operations 400 of FIG. 4 conclude. In some examples, to "cause" storage of information, the database storage circuitry 318 utilizes a system call to an operating system, to a storage controller, or to another system service capable of storing information in the indicator database. In some examples, the database storage circuitry 318 includes internal logic that functions to store information directly into the indicator database from a memory and/or a storage device.

FIG. 5 is a flowchart representative of example machine readable instructions and/or example operations that may be executed and/or instantiated by processor circuitry to implement a process to predict an identification of a campaign attack.

The machine readable instructions and/or operations of FIG. 5 are described in connection with the example campaign DISC model circuitry 302, and, more specifically, the example DISC score comparison circuitry 316, and the example campaign determination circuitry 310.

In the illustrated example of FIG. 5, the prediction process block (block 408) of FIG. 4 is expanded to show individual steps of a first process to predict an identification of a campaign using at least the DISC score. Turning to FIG. 5, the example machine readable instructions and/or the example operations 500 of FIG. 5 begin within block 408, specifically at block 502, at which, the DISC score comparison circuitry 308 compares the DISC score of the first indicator with one or more DISC scores associated with indicators stored in the indicator database. In some examples, the DISC score comparison circuitry 308 compares the DISC score associated with the first indicator with each of the one or more DISC scores associated with indicators stored in the indicator database 320 in separate comparisons per component. In some examples, the different components are weighted differently, for example, for a certain indicator, the lethality component (204 in FIG. 2A) may be a much higher weighted component for a given comparison because a new campaign has a lethality capability that far outstrips other campaigns, thus, a highest lethality component score alone may be largely dispositive of the new campaign. In some examples, all individual components per DISC score may be combined into an aggregate DISC score average and the average is utilized for comparison. In some examples, the DISC score comparison circuitry 308 keeps a ranked list of comparison results to provide for user consumption upon completion of the comparison process.

Then, at block 504, the campaign determination circuitry 310 determines the identification of the campaign attack at least partially in response to the DISC score of the first indicator being closer to the DISC score of a first stored indicator than to the DISC scores of one or more other stored indicators, where the first stored indicator is associated with the campaign. In some examples, the campaign determination circuitry 310 utilizes the ranked list of comparisons, described above, created by the DISC score comparison circuitry 308 and identifies the campaign associated with the top indicator on the list.

At block 506, the campaign determination circuitry 310 determines whether a difference between the DISC score of the first indicator from the received group of indicators and the DISC score of the first stored indicator in the indicator database are close enough to not exceed a maximum threshold value. In some examples, the campaign determination circuitry 310 has a difference limit between the two DISC scores (e.g., 10% of the absolute value difference between the two scores). For example, if the DISC scores of the compared indicators are more than 10% different based on a 10% maximum threshold, then, at block 508, the campaign determination circuitry 310 does not report out the identification of the campaign to one or more entities. For example, if the DISC score comparison has a difference does not exceed the difference limit, the campaign identification circuitry may send a report out to the user of a computer that has one or more of the IOCs in question, the administrator of a network that has one or more of the IOCs in question, or to virus protection community at large, among other entities. In some examples, the maximum threshold difference is designed to eliminate false positive identifications of campaigns. In some examples, the campaign determination circuitry 310 has a maximum threshold difference for each component of the DISC score in a comparison process. After block 506, in case the determination in block 506 is a "NO," or after block 508, in case the determination in block 506 is a "YES," the example machine readable instructions and/or the example operations 500 of FIG. 5 conclude.

FIG. 6 is a flowchart representative of example machine readable instructions and/or example operations that may be executed and/or instantiated by processor circuitry to implement an alternative process to predict an identification of a campaign attack.

The machine readable instructions and/or operations of FIG. 6 are described in connection with the example campaign DISC model circuitry 302, and, more specifically, the example DISC score calculation circuitry 326, the example DISC score comparison circuitry 308, the example DISC score comparison circuitry 316, the example campaign determination circuitry 310, and the example indicator sorting circuitry 312.

In the illustrated example of FIG. 6, the prediction process block (block 408) of FIG. 4 is expanded to show individual steps of a second process to predict an identification of a campaign using at least the DISC score. Turning to FIG. 6, the example machine readable instructions and/or the example operations 600 of FIG. 6 begin at block 602, at which, the example indicator sorting circuitry 312 sorts the group of indicators into a first subgroup of indicators with DISC scores and a second subgroup of indicators without DISC scores.

At block 604, the example DISC score calculation circuitry 326 calculates a combined DISC score from a set of DISC scores associated with the first subgroup of indicators. In some examples, the example DISC score calculation circuitry 326 combines each component value in the DISC score separately among all of the DISC scores associated with the first subgroup of indicators. For example, if there are 8 indicators in the first subgroup, then the example DISC score calculation circuitry 326 may take a mean value of the 8 lethality components, a mean value of the 8 determinism components, and a mean value of the 8 confidence components (see the different components in 214 of FIG. 2B). In some examples, the DISC score calculation circuitry 326 creates the combined DISC score as the three component mean values. In some examples, the DISC score calculation circuitry 326 calculates a combined DISC score for any number of components that define the DISC score. In some examples, the combined DISC score aggregates the components per DISC score into a single value and all single value aggregate DISC scores across the DISC scores associated with the first subgroup are combined into a combined aggregate DISC score.

At block 606, the example DISC score comparison circuitry 308 compares the combined DISC score with one or more DISC scores associated with indicators stored in the indicator database. In some examples, the DISC score comparison circuitry 316 generates a ranked list, as discussed above in regard to the description of FIG. 5.

At block 608, the example campaign determination circuitry 310 determines the identification of the campaign attack at least partially in response to the combined DISC score of the first indicator being closer to the DISC score of a first stored indicator than with one or more other stored indicators, where the first stored indicator is associated with the campaign. In some examples, the maximum threshold differential process steps of block 506 and block 508 of FIG. 5 are then implemented as part of the process of FIG. 6 when maximum DISC score differences are implemented. Otherwise, after block 608 is complete, the example machine readable instructions and/or the example operations 600 of FIG. 6 conclude.

Figure 7:
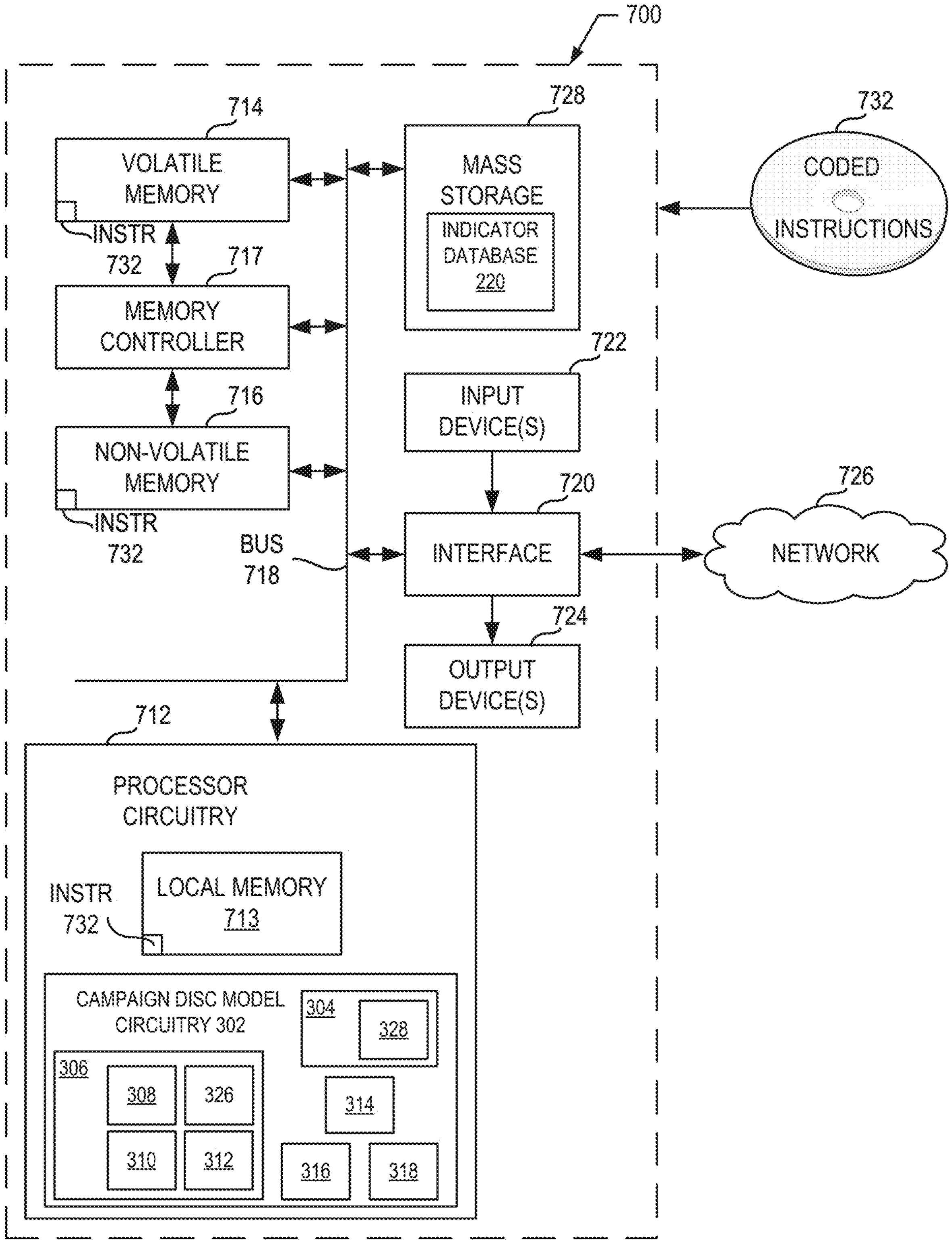
FIG. 7 is a block diagram of an example processor platform structured to execute and/or instantiate the machine readable instructions and/or the operations of FIGS. 4-6 to implement the campaign DISC model circuitry of FIG. 3.

FIG. 7 is a block diagram of an example processor platform 700 structured to execute and/or instantiate the machine readable instructions and/or operations of FIGS. 4-6 to implement the apparatus of FIG. 3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the example campaign DISC model circuitry 302, the example indicator gathering circuitry 304, the example campaign attack identification circuitry 306, the example DISC score comparison circuitry 308, the example campaign determination circuitry 310, the example indicator sorting circuitry 312, the example indicator scoring circuitry 314, the example database querying circuitry 316, and the example database storage circuitry 318, the example DISC score calculation circuitry 326, and the example attack data parsing circuitry 328.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output devices 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 732, which may be implemented by the machine readable instructions of FIGS. 4-6, may be stored in the mass storage device 728, in the volatile memory 714, in the non-volatile memory 716, and/or on a removable non-transitory computer readable storage medium such as a CD or DVD.

FIG. 5 is a block diagram of an example implementation of the processor circuitry 712 of FIG. 7. In this example, the processor circuitry 712 of FIG. 7 is implemented by a microprocessor 800. For example, the microprocessor 800 may implement multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowcharts of FIGS. 4-6.

The cores 802 may communicate by an example bus 804. In some examples, the bus 804 may implement a communication bus to effectuate communication associated with one(s) of the cores 802. For example, the bus 804 may implement at least one of an Inter-Integrated Circuit (I2C) bus, a Serial Peripheral Interface (SPI) bus, a PCI bus, or a PCIe bus. Additionally or alternatively, the bus 804 may implement any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2_cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 414, 416 of FIG. 4). Typically, higher levels of memory in the hierarchy exhibit lower access time and have smaller storage capacity than lower levels of memory. Changes in the various levels of the cache hierarchy are managed (e.g., coordinated) by a cache coherency policy.

Figure 8:
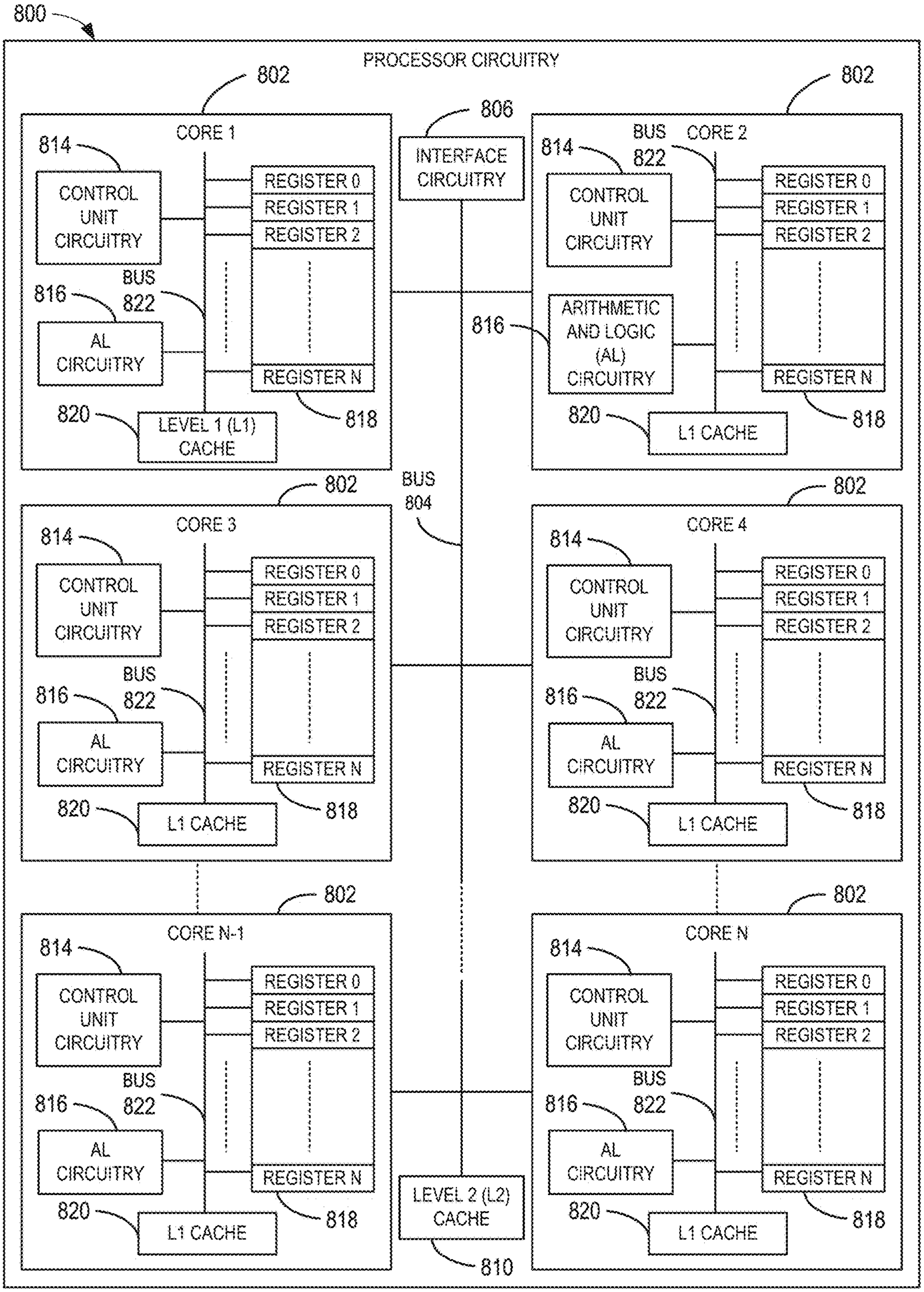
FIG. 8 is a block diagram of an example implementation of the processor circuitry of FIG. 7.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the L1 cache 820, and an example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register (s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The bus 820 may implement at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
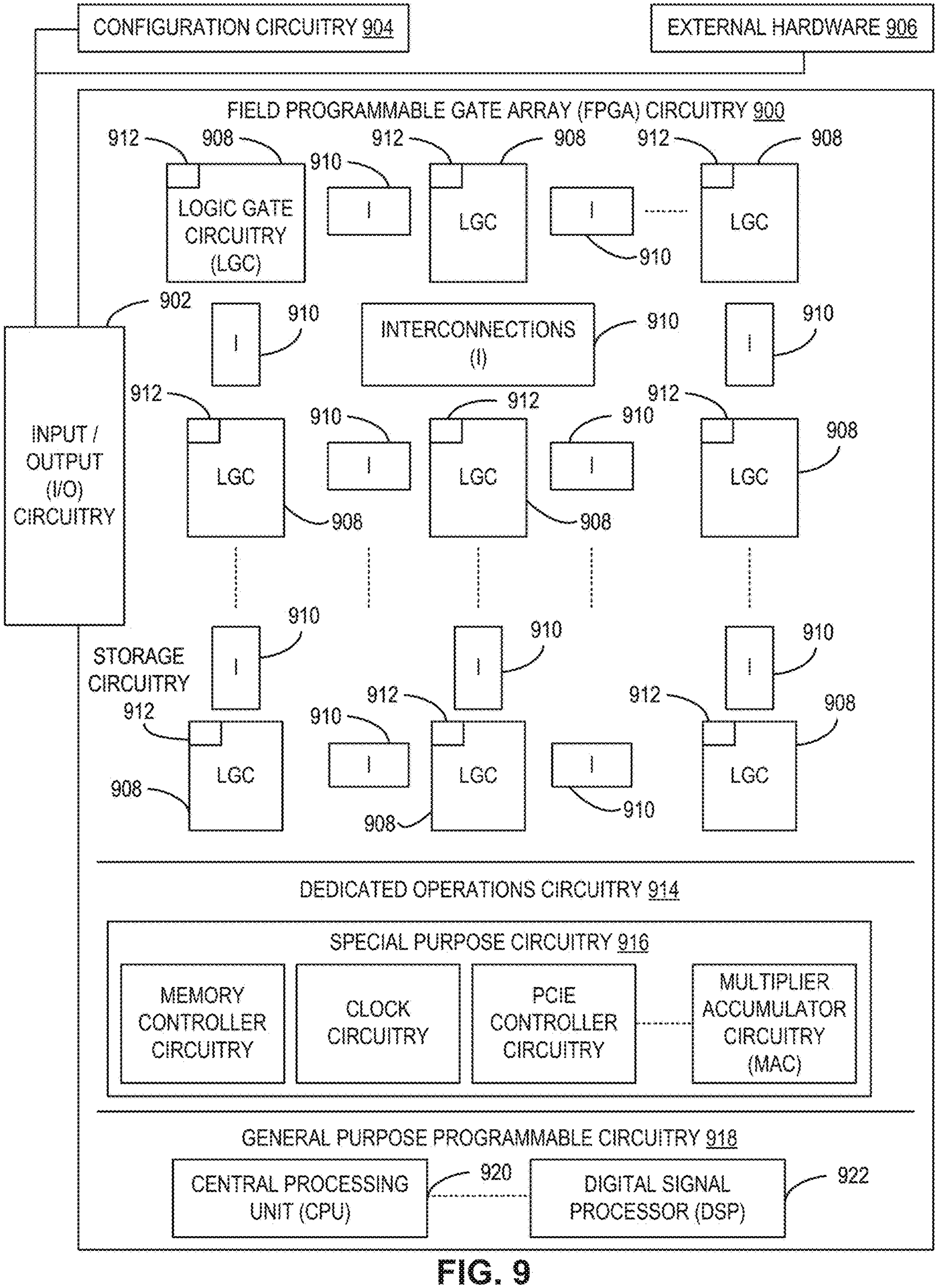
FIG. 9 is a block diagram of another example implementation of the processor circuitry of FIG. 7.

FIG. 9 is a block diagram of another example implementation of the processor circuitry 712 of FIG. 7. In this example, the processor circuitry 712 is implemented by FPGA circuitry 900. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowcharts of FIGS. 4-6 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowcharts of FIGS. 4-6. In particular, the FPGA 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowcharts of FIG. 4-6. As such, the FPGA circuitry 900 may be structured to effectively instantiate some or all of the machine readable instructions of the flowcharts of FIG. 4-6 as dedicated logic circuits to perform the operations corresponding to those software instructions in a dedicated manner analogous to an ASIC. Therefore, the FPGA circuitry 900 may perform the operations corresponding to the some or all of the machine readable instructions of FIGS. 4-6 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware (e.g., external hardware circuitry) 906. For example, the configuration circuitry 904 may implement interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may implement the microprocessor 800 of FIG. 8. The FPGA circuitry 900 also includes an array of example logic gate circuitry 908, a plurality of example configurable interconnections 910, and example storage circuitry 912. The logic gate circuitry 908 and interconnections 910 are configurable to instantiate one or more operations that may correspond to at least some of the machine readable instructions of FIGS. 4-6 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowcharts of FIG. 4-6 may be executed by one or more of the cores 802 of FIG. 8 and a second portion of the machine readable instructions represented by the flowcharts of FIGS. 4-6 may be executed by the FPGA circuitry 900 of FIG. 9.

In some examples, the processor circuitry 712 of FIG. 7 may be in one or more packages. For example, the processor circuitry 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Figure 10:
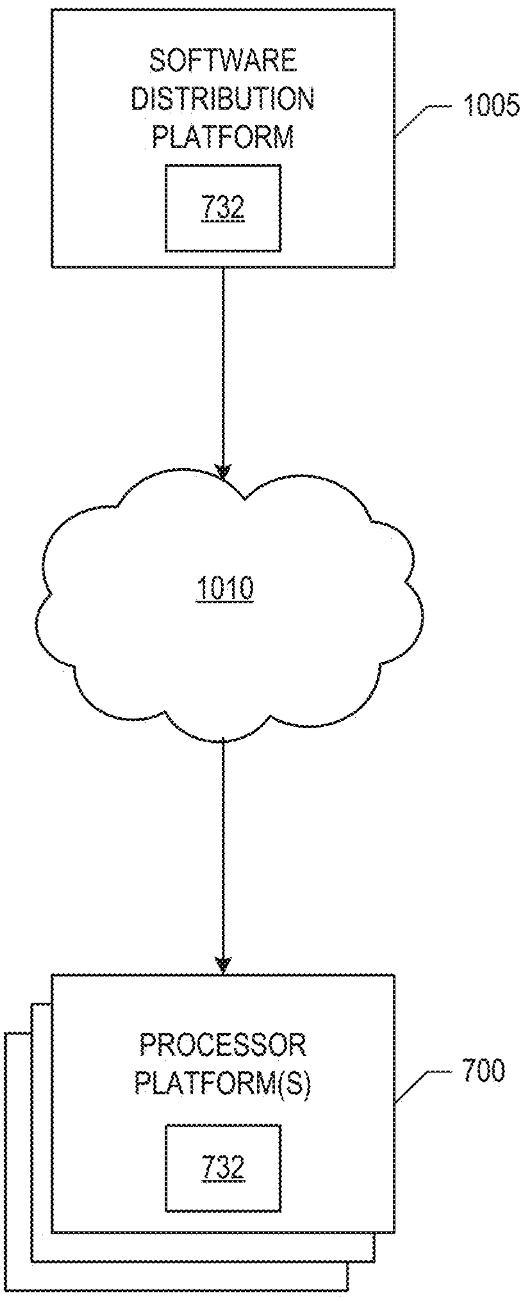
FIG. 10 is a block diagram of an example software distribution platform (e.g., one or more servers) to distribute software (e.g., software corresponding to the example machine readable instructions of FIGS. 4-6) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 732 of FIG. 7 to hardware devices owned and/or operated by third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 732 of FIG. 7. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine readable instructions 732, which may correspond to the example machine readable instructions 400, 500, and 600 of FIGS. 4-6, as described above. The one or more servers of the example software distribution platform 1005 are in communication with a network 1010, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 732 from the software distribution platform 1005. For example, the software, which may correspond to the example machine readable instructions 400, 500, and 600 of FIGS. 4-6, may be downloaded to the example processor platform 400, which is to execute the machine readable instructions 732 to implement the campaign DISC model circuitry 302 in FIG. 3. In some example, one or more servers of the software distribution platform 1005 periodically offer, transmit, and/or force updates to the software (e.g., the example machine readable instructions 732 of FIG. 7) to ensure improvements, patches, updates, etc., are distributed and applied to the software at the end user devices.

From the foregoing, it will be appreciated that example systems, methods, apparatus, and articles of manufacture have been disclosed that implement a deterministic indicator and confidence scoring model. The disclosed systems, methods, apparatus, and articles of manufacture improve the efficiency of using a computing device by improving the ability to identify virus campaigns through a series of indicators of compromise that are present in an environment. The disclosed systems, methods, apparatus, and articles of manufacture are accordingly directed to one or more improvement(s) in the operation of a machine such as a computer or other electronic and/or mechanical device.

Example 1 includes an apparatus, comprising at least one memory, instructions, and processor circuitry to at least one of execute or instantiate the instructions to obtain a group of indicators, query an indicator database with an indicator from the group of indicators, and predict an identification of a campaign in response to the indicator having a current deterministic indicator and confidence scoring (DISC) score in the indicator database, wherein the DISC score represents at least one of a lethality component, a determinism component, or a confidence component of the indicator.

Example 2 includes the apparatus of example 1, wherein the indicator is a first indicator, and wherein to predict an identification of the campaign attack further includes the processor circuitry to compare the DISC score of the first indicator with one or more DISC scores associated with indicators stored in the indicator database, and determine the identification of the campaign at least partially in response to the DISC score of the first indicator being a closer score to a DISC score of a first stored indicator in the indicator database than to one or more other stored indicators in the indicator database, the first stored indicator associated with the campaign.

Example 3 includes the apparatus of example 1, wherein the indicator is a first indicator, wherein the processor circuitry is to sort the group of indicators into a first subgroup of indicators with DISC scores and a second subgroup of indicators without DISC scores, calculate a combined DISC score from a set of DISC scores associated with each of the first subgroup of indicators, compare the combined DISC score with one or more DISC scores associated with indicators stored in the indicator database, and determine the identification of the campaign at least partially in response to the combined DISC score being a closer score to a DISC score of a first stored indicator in the indicator database than to one or more other stored indicators in the indicator database, the first stored indicator associated with the campaign.

Example 4 includes the apparatus of example 3, wherein to compare the combined DISC score with one or more DISC scores associated with indicators stored in the indicator database further includes the processor circuitry to compare the combined DISC score with one or more DISC scores associated with indicators stored in the indicator database using a Bayesian statistical probability model, wherein a value of the combined DISC score indicates a higher probability of a presence of the campaign associated with the first stored indicator than a presence of one or more other campaigns.

Example 5 includes the apparatus of example 1, wherein the processor circuitry is to score the indicator with a new DISC score in response to the indicator not having a current DISC score.

Example 6 includes the apparatus of example 5, wherein the processor circuitry is to cause the new DISC score to be stored in the indicator database.

Example 7 includes the apparatus of example 1, wherein the processor circuitry is to compare the DISC score with one or more DISC scores associated with indicators stored in the indicator database, and report the identification of the campaign in response to a difference between the DISC score and a DISC score associated with at least one of the indicators stored in the indicator database not exceeding a maximum threshold value.

Example 8 includes the apparatus of example 1, wherein the processor circuitry is to obtain attack data from one or more sources, and parse the attack data into the group of indicators.

Example 9 includes At least one computer readable medium comprising instructions that, when executed, cause processor circuitry to at least access a group of indicators, query an indicator database with an indicator from the group of indicators, and predict an identification of a campaign in response to the indicator having a current deterministic indicator and confidence scoring (DISC) score in the indicator database, wherein the DISC score represents at least one of a lethality component, a determinism component, or a confidence component of the indicator.

Example 10 includes the at least one computer readable medium of example 9, wherein the indicator is a first indicator, wherein the instructions, when executed, cause the processor circuitry to compare the DISC score of the first indicator with one or more DISC scores associated with indicators stored in the indicator database, and determine the identification of the campaign at least partially in response to the DISC score of the first indicator being a closer score to a DISC score of a first stored indicator in the indicator database than to one or more other stored indicators in the indicator database, the first stored indicator associated with the campaign.

Example 11 includes the at least one computer readable medium of example 9, wherein the indicator is a first indicator, wherein the instructions, when executed, cause the processor circuitry to sort the group of indicators into a first subgroup of indicators with DISC scores and a second subgroup of indicators without DISC scores, calculate a combined DISC score from a set of DISC scores associated with each of the first subgroup of indicators, compare the combined DISC score with one or more DISC scores associated with indicators stored in the indicator database, and determine the identification of the campaign at least partially in response to the combined DISC score being a closer score to a DISC score of a first stored indicator in the indicator database than to one or more other stored indicators in the indicator database, the first stored indicator associated with the campaign.

Example 12 includes the at least one computer readable medium of example 11, wherein to compare the combined DISC score with one or more DISC scores associated with indicators stored in the indicator database further include the instructions, when executed, cause the processor circuitry to compare the combined DISC score with one or more DISC scores associated with indicators stored in the indicator database using a Bayesian statistical probability model, wherein a value of the combined DISC score indicates a higher probability of a presence of the campaign associated with the first stored indicator than a presence of one or more other campaigns.

Example 13 includes the at least one computer readable medium of example 9, wherein the instructions, when executed, cause the processor circuitry to indicator scoring circuitry to score the indicator with a new DISC score in response to the indicator not having a current DISC score.

Example 14 includes the at least one computer readable medium of example 13, wherein the instructions, when executed, cause the processor circuitry to cause the new DISC score to be stored in the indicator database.

Example 15 includes the at least one computer readable medium of example 9, wherein the instructions, when executed, cause the processor circuitry to compare the DISC score with one or more DISC scores associated with indicators stored in the indicator database, and report the identification of the campaign in response to a difference between the DISC score and a DISC score associated with at least one of the indicators stored in the indicator database not exceeding a maximum threshold value.

Example 16 includes the at least one computer readable medium of example 9, wherein the instructions, when executed, cause the processor circuitry to obtain attack data from one or more sources, and parse the attack data into the group of indicators.

Example 17 includes an apparatus, comprising an indicator database, and processor circuitry including one or more of at least one of a central processor unit, a graphic processor unit or a digital signal processor, the at least one of the central processor unit, the graphic processor unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or an Application Specific Integrate Circuitry (ASIC) including logic gate circuitry to perform one or more third operations, the processor circuitry to perform at least one of the one or more first operations, the one or more second operations or the one or more third operations to instantiate indicator gathering circuitry to receive a group of indicators, database querying circuitry to query an indicator database with an indicator from the group of indicators, and campaign attack identification circuitry to predict an identification of the campaign attack in response to the indicator having a current deterministic indicator and confidence scoring (DISC) score in the indicator database, wherein the DISC score represents at least one of a lethality component, a determinism component, or a confidence component of the indicator.

Example 18 includes the apparatus of example 17, wherein the indicator is a first indicator, wherein the processor circuitry to perform at least one of the one or more first operations, the one or more second operations or the one or more third operations to instantiate DISC score comparison circuitry to compare the DISC score of the first indicator of the group of indicators with one or more DISC scores associated with indicators stored in the indicator database, and campaign determination circuitry to determine the identification of the campaign at least partially in response to the DISC score of the first indicator being a closer score to a DISC score of a first stored indicator in the indicator database than to one or more other stored indicators in the indicator database, the first stored indicator associated with the campaign.

Example 19 includes the apparatus of example 17, wherein the indicator is a first indicator, wherein the processor circuitry to perform at least one of the one or more first operations, the one or more second operations or the one or more third operations to instantiate indicator sorting circuitry to sort the group of indicators into a first subgroup of indicators with DISC scores and a second subgroup of indicators without DISC scores, DISC score calculation circuitry to calculate a combined DISC score from a set of DISC scores associated with the first subgroup of indicators, DISC score comparison circuitry to compare the combined DISC score with one or more DISC scores associated with indicators stored in the indicator database, and campaign attack identification circuitry to determine the identification of the campaign at least partially in response to the combined DISC score being a closer score to a DISC score of a first stored indicator in the indicator database than to one or more other stored indicators in the indicator database, the first stored indicator associated with the campaign.

Example 20 includes the apparatus of example 19, wherein to compare the combined DISC score with the one or more DISC scores associated with the indicators stored in the indicator database further includes the processor circuitry to perform at least one of the one or more first operations, the one or more second operations or the one or more third operations to instantiate the DISC score comparison circuitry to compare the combined DISC score with the one or more DISC scores associated with the indicators stored in the indicator database using a Bayesian statistical probability model, wherein a value of the combined DISC score indicates a higher probability of a presence of the campaign associated with the first stored indicator than a presence of one or more other campaigns.

Example 21 includes the apparatus of example 17, wherein the processor circuitry to perform at least one of the one or more first operations, the one or more second operations or the one or more third operations to instantiate indicator scoring circuitry to score the indicator with a new DISC score in response to the indicator not having a current DISC score.

Example 22 includes the apparatus of example 21, wherein the processor circuitry to perform at least one of the one or more first operations, the one or more second operations or the one or more third operations to instantiate database storage circuitry to cause the new DISC score to be stored in the indicator database.

Example 23 includes the apparatus of example 17, wherein the processor circuitry to perform at least one of the one or more first operations, the one or more second operations or the one or more third operations to instantiate DISC score comparison circuitry to compare the DISC score with one or more DISC scores associated with indicators stored in the indicator database, and campaign determination circuitry to report the identification of the campaign in response to a difference between the DISC score and a DISC score associated with at least one of the indicators stored in the indicator database not exceeding a maximum threshold value.

Example 24 includes the apparatus of example 17, wherein the processor circuitry to perform at least one of the one or more first operations, the one or more second operations or the one or more third operations to instantiate attack data parsing circuitry to obtain attack data from one or more sources, and indicator gathering circuitry to parse the attack data into the group of indicators.

Example 25 includes a method, comprising receiving a group of indicators, querying an indicator database with an indicator from the group of indicators, and predicting an identification of a campaign in response to the indicator having a current deterministic indicator and confidence scoring (DISC) score in the indicator database, wherein the DISC score represents at least one of a lethality component, a determinism component, or a confidence component of the indicator.

Example 26 includes the method of example 25, wherein the indicator is a first indicator, further including comparing the DISC score of the first indicator with one or more DISC scores associated with indicators stored in the indicator database, and determining the identification of the campaign at least partially in response to the DISC score of the first indicator being a closer score to a DISC score of a first stored indicator in the indicator database than to one or more other stored indicators in the indicator database, the first stored indicator associated with the campaign.

Example 27 includes the method of example 25, wherein the indicator is a first indicator, further including sorting the group of indicators into a first subgroup of indicators with DISC scores and a second subgroup of indicators without DISC scores, calculating a combined DISC score from a set of DISC scores associated with the first subgroup of indicators, and comparing the combined DISC score with one or more DISC scores associated with indicators stored in the indicator database, and determining the identification of the campaign at least partially in response to the combined DISC score being a closer score to a DISC score of a first stored indicator in the indicator database than to one or more other stored indicators in the indicator database, the first stored indicator associated with the campaign.

Example 28 includes the method of example 27, wherein comparing the combined DISC score with one or more DISC scores associated with indicators stored in the indicator database further includes comparing the combined DISC score with one or more DISC scores associated with indicators stored in the indicator database using a Bayesian statistical probability model, wherein a value of the combined DISC score indicates a higher probability of a presence of the campaign associated with the first stored indicator than a presence of one or more other campaigns.

Example 29 includes the method of example 25, further including scoring the indicator with a new DISC score in response to the indicator not having a current DISC score.

Example 30 includes the method of example 29, further including causing the new DISC score to be stored in the indicator database.

Example 31 includes the method of example 25, further including comparing the DISC score with one or more DISC scores associated with indicators stored in the indicator database, and reporting the identification of the campaign in response to a difference between the DISC score and a DISC score associated with at least one of the indicators stored in the indicator database not exceeding a maximum threshold value.

Example 32 includes the method of example 25, further including obtaining attack data from one or more sources, and parsing the attack data into the group of indicators.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus, comprising:
- at least one memory;
- machine-readable instructions; and
- at least one processor circuit to be programmed by the machine-readable instructions to:
  - obtain a first indicator;
  - determine whether the first indicator has a deterministic indicator and confidence model (DISC) score assigned to the first indicator in an indicator database;
  - in response to a determination that the first indicator does not have the DISC score, compute a first DISC score for the first indicator, wherein to compute the first DISC score the at least one processor circuit is to:
    - compare the first indicator to a second indicator in the indicator database to determine a similarity between the first indicator and the second indicator, wherein the similarity is determined using a neural network; and
    - assign a DISC score of the second indicator to the first indicator based on the determined similarity between the first indicator and the second indicator.

2. The apparatus of claim 1, wherein, to compare the first indicator to the second indicator in the indicator database to determine the similarity, one or more of the at least one processor circuit is to use the neural network to determine at least one of a code similarity, a data similarity, or a language similarity between the first indicator and the second indicator.

3. The apparatus of claim 1, wherein, in response to a determination that the first indicator does have the DISC score, one or more of the at least one processor circuit is to employ a neural network to predict an identification of a campaign based on the DISC score.

4. The apparatus of claim 3, wherein, to predict the identification of the campaign, one or more of the at least one processor circuit is to:
- select a current DISC score from the indicator database, the selection based on a difference between the current DISC score and the DISC score of the first indicator;
- determine whether the difference between the current DISC score and the DISC score of the first indicator exceeds a threshold, the threshold based on at least one of a lethality component, a determinism component, or a confidence component; and in response to a determination that the difference does not exceed the threshold, report the identification of the campaign to an entity.

5. The apparatus of claim 1, wherein, to obtain the first indicator, one or more of the at least one processor circuit is to:

receive data from a campaign attack; and parse the data to retrieve the first indicator.

6. The apparatus of claim 1, wherein one or more of the at least one processor circuit is to store the first DISC score of the first indicator in the indicator database.

7. The apparatus of claim 1, wherein the determination that the first indicator does not have the DISC score includes at least one of a failed query to the indicator database or a value of a query to the indicator database being zero.

8. At least one non-transitory machine-readable medium comprising machine-readable instructions to cause at least one processor circuit to at least:

obtain a first indicator;

determine whether the first indicator has a deterministic indicator and confidence model (DISC) score assigned to the first indicator in an indicator database;

in response to a determination that the first indicator does not have the DISC score, compute a first DISC score for the first indicator, wherein to compute the first DISC score the at least one processor circuit is to:

compare the first indicator to a second indicator in the indicator database to determine a similarity between the first indicator and the second indicator, wherein the similarity is determined using a neural network; and assign a DISC score of the second indicator to the first indicator based on the determined similarity between the first indicator and the second indicator.

9. The at least one non-transitory machine-readable medium of claim 8, wherein, to compare the first indicator to the second indicator in the indicator database to determine the similarity, one or more of the at least one processor circuit is to use the neural network to determine at least one of a code similarity, a data similarity, or a language similarity between the first indicator and the second indicator.

10. The at least one non-transitory machine-readable medium of claim 8, wherein, in response to a determination that the first indicator does have the DISC score, one or more of the at least one processor circuit is to employ a neural network to predict an identification of a campaign based on the DISC score.

11. The at least one non-transitory machine-readable medium of claim 10, wherein, to predict the identification of the campaign, one or more of the at least one processor circuit is to:

select a current DISC score from the indicator database, the selection based on a difference between the current DISC score and the DISC score of the first indicator;

determine whether the difference between the current DISC score and the DISC score of the first indicator exceeds a threshold, the threshold based on at least one of a lethality component, a determinism component, or a confidence component; and in response to a determination that the difference does not exceed the threshold, report the identification of the campaign to an entity.

12. The at least one non-transitory machine-readable medium of claim 8, wherein, to obtain the first indicator, one or more of the at least one processor circuit is to:

receive data from a campaign attack; and parse the data to retrieve the first indicator.

13. The at least one non-transitory machine-readable medium of claim 8, wherein one or more of the at least one processor circuit is to store the first DISC score of the first indicator in the indicator database.

14. The at least one non-transitory machine-readable medium of claim 8, wherein the determination that the first indicator does not have the DISC score includes at least one of a failed query to the indicator database or a value of a query to the indicator database being zero.

15. A method comprising:

obtaining a first indicator;

determining, by at least one processor circuit programmed by at least one instruction, whether the first indicator has a deterministic indicator and confidence model (DISC) score assigned to the first indicator in an indicator database; and in response to a determination that the first indicator does not have the DISC score, computing, by one or more of the at least one processor circuit, a first DISC score for the first indicator by:

comparing the first indicator to a second indicator in the indicator database to determine a similarity between the first indicator and the second indicator, wherein the similarity is determined using a neural network; and assigning a DISC score of the second indicator to the first indicator based on the determined similarity between the first indicator and the second indicator.

16. The method of claim 15, wherein comparing the first indicator to the second indicator in the indicator database to determine the similarity further includes using the neural network to determine a code similarity, a data similarity, or a language similarity between the first indicator and the second indicator.

17. The method of claim 15, further including, in response to a determination that the first indicator does have the DISC score, employing a neural network to predict an identification of a campaign based on the DISC score.

18. The method of claim 17, wherein, to predict the identification of the campaign, further includes:

selecting a current DISC score from the indicator database, the selection based on a difference between the current DISC score and the DISC score of the first indicator;

determining whether the difference between the current DISC score and the DISC score of the first indicator exceeds a threshold, the threshold based on at least one of a lethality component, a determinism component, or a confidence component; and in response to a determination that the difference does not exceed the threshold, report the identification of the campaign to an entity.

19. The method of claim 15, wherein obtaining the first indicator further includes:

receiving data from a campaign attack; and parsing the data to retrieve the first indicator.

20. The method of claim 15, further including storing the first DISC score of the first indicator in the indicator database.

* * * * *